United States Patent [19]

Fox

[11] Patent Number: 4,875,782
[45] Date of Patent: Oct. 24, 1989

[54] AUTOMATED TEMPERATURE PROBE APPARATUS AND METHOD

[75] Inventor: Steve A. Fox, Hickory, N.C.

[73] Assignee: Normag Corporation, Hickory, N.C.

[21] Appl. No.: 147,525

[22] Filed: Jan. 25, 1988

[51] Int. Cl.[4] .......................... G01K 7/04; G01K 13/02
[52] U.S. Cl. .................................. 374/148; 73/204.11; 136/230; 374/186
[58] Field of Search ................. 374/148, 54, 186, 137, 374/142; 425/144; 73/204 R

[56] References Cited

U.S. PATENT DOCUMENTS

| | | | |
|---|---|---|---|
| 2,722,716 | 11/1955 | Henning | 425/144 |
| 2,741,126 | 4/1956 | Anderson et al. | 374/137 |
| 2,799,756 | 6/1957 | Hutchins . | |
| 3,463,005 | 8/1969 | Hance | 374/186 X |
| 3,589,192 | 6/1971 | Sabovik | 374/148 X |
| 3,717,034 | 2/1973 | Dukelow et al. . | |
| 3,742,763 | 7/1973 | Sczerba . | |
| 3,843,290 | 10/1974 | Sender | 374/142 X |
| 3,870,445 | 3/1975 | Hold et al. | 425/144 |
| 3,921,452 | 11/1975 | Sartorius . | |
| 3,946,610 | 3/1976 | Sartorius . | |
| 3,955,419 | 5/1976 | Barton et al. | 374/166 |
| 4,075,035 | 2/1978 | Trevedy . | |
| 4,118,986 | 10/1978 | Werner et al. | 374/179 X |
| 4,438,649 | 3/1984 | Gilman . | |
| 4,527,896 | 7/1985 | Irani et al. | 374/133 X |

Primary Examiner—Daniel M. Yasich
Attorney, Agent, or Firm—Richard E. Jenkins

[57] ABSTRACT

An apparatus and method for measuring the temperature of a viscous material flow by traversing at least a portion of the flow stream are provided. The apparatus includes an elongated temperature probe which is linearly translated by a motor which has a position sensing means operatively connected thereto for determining the relative position of the probe during movement thereof. A remote control and indicator is electrically connected to the temperature probe for selectively actuating the probe and providing temperature and corresponding position data relating to movement thereof.

14 Claims, 3 Drawing Sheets

AUTOMATED TEMPERATURE PROBE APPARATUS AND METHOD

TECHNICAL FIELD

The present invention relates to an apparatus and method for measuring the temperature of a viscous material flow, such as melted plastic material or the like, by traversing the flow stream and determining the temperature at a plurality of locations therein, and which is characterized by the ability to obtain an accurate temperature profile of the flow stream through the use of an automated temperature probe which is remotely controlled.

BACKGROUND

It is desirable to measure the temperature of the viscous material in plastic injection molding or extruding machinery and the like as the viscous material flows from the barrel of the machine to a mold or die. It has been found that an inaccurate temperature setting can cause defects in the article being manufactured such as flow lines, discolorations, voids, and brittleness. In order to attempt to prevent such flaws in the finished article, it is desirable to monitor the temperature of the viscous material flow so that the necessary parameters may be adjusted in the upstream portion of the molding or extruding equipment to better maintain optimum temperature. The measurements of the temperature of the viscous material flow are typically made by inserting a thermocouple probe into the viscous material flow through a threaded hole provided in the barrel of the extruding or molding machine in a conventional manner well known to those skilled in the art. Conventional measurement techniques include inserting several different thermocouple assemblies having various probe depths in order to measure the temperature of the viscous material flow at varying depths.

More recently, it has become known to use a manually adjusted melt thermocouple manufactured by Advanced Dynamics of Cleveland, OH. according to U.S. Pat. No. 3,589,192. However, difficulties are encountered with the manually adjusted melt thermocouple. In order to obtain a temperature profile of a viscous material flow, a time consuming and laborious process is necessary which requires repeatedly adjusting the thumb wheel and taking a temperature reading to obtain sufficient temperature and corresponding position readings to manually plot a temperature versus position temperature profile. This process is not only very time consuming, but it entails some discomfort and even risk since the operator is required to be in close proximity to the molding or extruding equipment. Moreover, many times two individuals are necessary in order to properly us the manually adjustable melt thermocouple since one must manually adjust the probe while the second individual takes notes as to temperatures and corresponding positions being called out by the first individual.

DISCLOSURE OF THE INVENTION

In accordance with the present invention, an apparatus is provided for accurately measuring the temperature profile of a viscous material flow which comprises an elongated temperature probe adapted for linear movement across at least a portion of the viscous material flow. Motor means are operatively associated with the temperature probe in order to impart selective linear movement thereto. Position sensing means are operatively associated with the temperature probe in order to determine the relative position of the probe during linear movement thereof by the motor means, and a remote control is provided in order to selectively actuate the probe. In this fashion, the automated temperature probe assembly of the present invention may be remotely controlled in order to obtain a temperature profile of a viscous material flow at a remote location from the molding or extruding equipment through which the flow is moving.

It is accordingly an object of the present invention to provide an automated temperature probe apparatus and method adapted to obtain a temperature profile of a viscous material flow by traversing at least a portion of the flow stream and determining the temperature at a plurality of locations therein and which is characterized by remote control actuation of the probe assembly.

It is a more particular object of the present invention to provide an automated temperature probe assembly for measuring the temperature of a viscous material flow at a plurality of locations and remotely indicating temperature and corresponding position data.

It is a further object of the present invention to provide an automated temperature probe assembly which is selectively controlled from a remote location and provides a remote readout of temperature and corresponding position for a plurality of points in a viscous material flow.

It is a more particular object of the present invention to provide an automated temperature probe which is remotely controlled and provides a continuous remote readout of temperature and position during movement through at least a portion of a viscous material flow.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF THE INVENTION

Viscous material flows in plastic injection molding or extruding machines possess known temperature variations across the diameter thereof. As noted hereinbefore, processing defects may occur due to viscosity variations resulting from the temperature variations. For example, for some plastics a 40 degree Fahrenheit temperature variation can cause a 50% viscosity variation. This degree of viscosity variation can result in uneven viscous material flow and resulting anomalies in the product being produced. Therefore, it is very important to obtain accurate and timely temperature profile data relating to the viscous material flow in order to assure uniform quality of a product being molded or extruded therefrom. The temperature profile data may be utilized to make corrective process adjustments on the plastic injection molding or extruding equipment and, in one contemplated use of the present invention, the automated temperature probe assembly may be interactively associated with the processing equipment in order to provide substantially instantaneous process adjustments on the basis of temperature profile data measured by the automated temperature probe assembly. It is to be understood that the term "viscous material flow" as used herein may refer to substantially any viscous flow but is particularly intended to refer to melted plastic material and the like.

Figure 1:
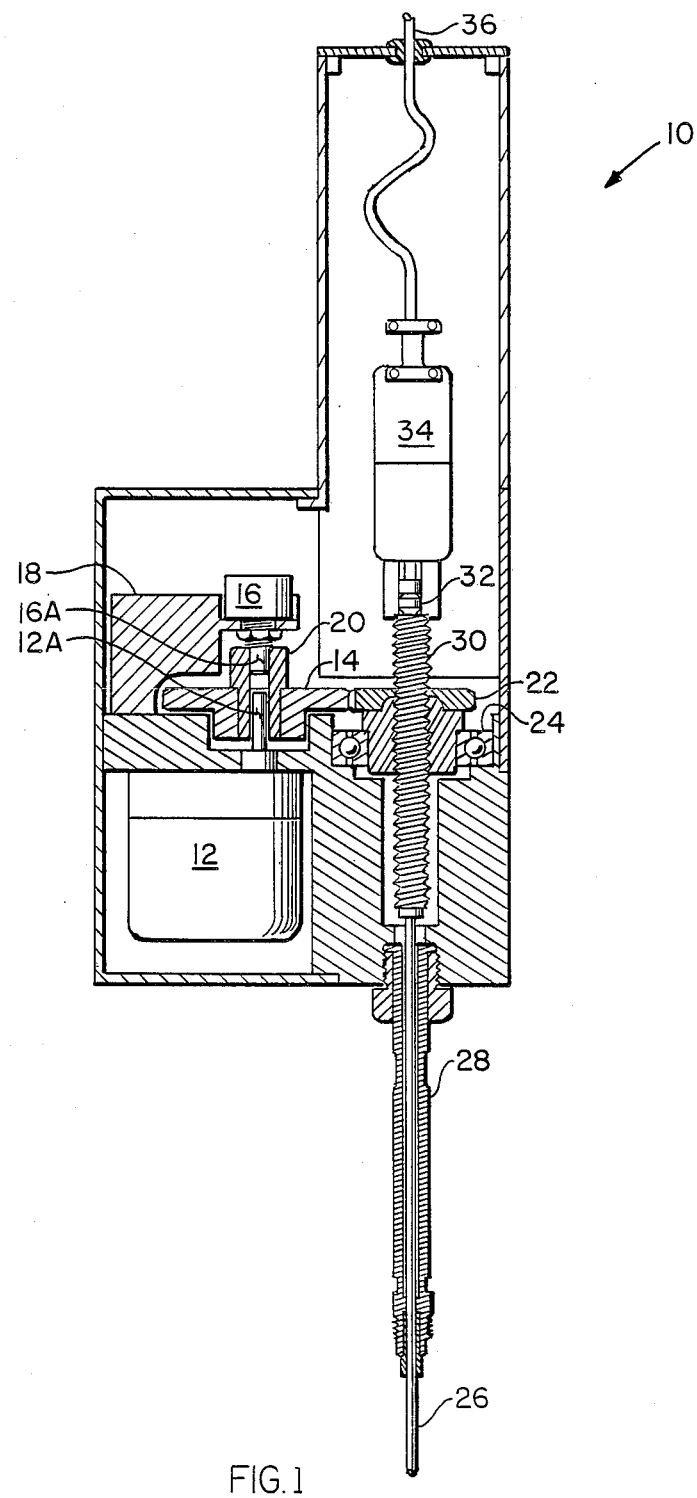
FIG. 1 is a side sectional view of an automated temperature probe apparatus in accordance with the present invention.

With reference now specifically to the drawings, FIG. 1 presents a side cut-away view of an automated temperature probe assembly embodying the features of the present invention. The apparatus, generally designated 10, includes an electric motor 12, which may be any suitable AC or DC reversible drive motor, and drive shaft 12A extending therefrom and fixably secured to driver gear 14. A potentiometer 16 is mounted above motor 12 on mounting block 18 with potentiometer shaft 16A fixably secured within driver gear sleeve 20. In this fashion, motor shaft 12A and potentiometer shaft 16A are both fixably secured to drive gear 14 so that when motor 12 is actuated, driver gear 14 and potentiometer shaft 16A are both caused to rotate and potentiometer 16 is thus able to detect movement of driver gear 14. Driver gear 14 meshes with driven gear 22 which is rotatably mounted in the housing of automated temperature probe 10 by bearings 24.

A temperature probe 26, preferably a thermocouple, is slidably positioned within tube probe 28 and has a non-rotating screw 30 fixed thereto. Screw 30 is threadably received by driven gear 22 so as to be linearly translated by rotation of driven gear 22 by driver gear 14 which is in turn driven by motor 12. The linear drive assembly described heretofore allows for precise control of the linear movement desired to be imparted to temperature probe 26 in order to extend within a viscous material flow and measure the temperature at a plurality of locations therein.

Figure 2:
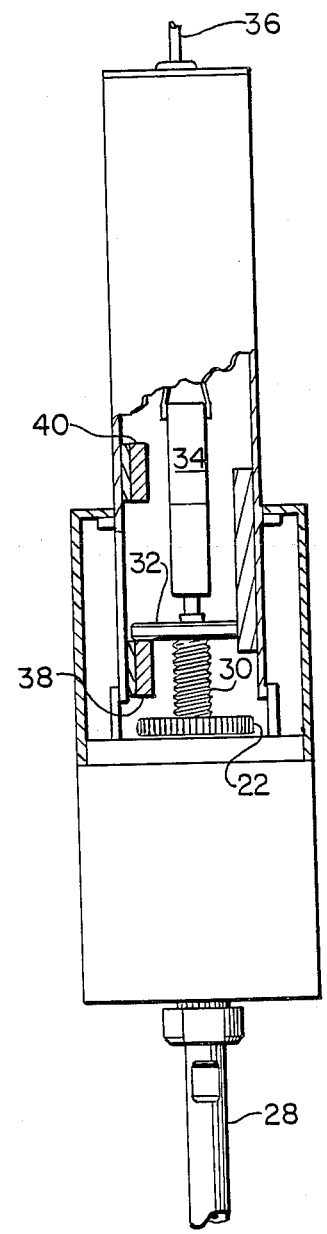
FIG. 2 is a front view, with parts broken away for clarity, of an automated temperature probe apparatus in accordance with the present invention.

With reference now particularly to FIG. 2, it can be further seen that temperature probe 26 further includes a travel limiting bar 32 and an electrical connector housing 34 wherein one end of electrical connector wire 36 is connected to temperature probe 26. The other end of electrical connector wire 36 (see FIG. 3) is connected to remote control and indicator 50. Travel limiting bar 32 serves to contact first limit switch 38 at the outermost driven position of temperature probe 26 and second limit switch 40 at the innermost driven position of temperature probe 26. First limit switch 38 and second limit switch 40 may be suitably adjusted in order to set desired "in" and "out" parameters for movement by temperature probe 26. By way of example, if automated temperature probe assembly 10 is secured to an extruder with a ¾" diameter bore B (see FIG. 3), first limit switch 38 and second limit switch 40 may be set so that temperature probe 26 will extend 11/16 inch into the extruder bore B of extruder barrel A prior to travel limiting bar 32 contacting first limit switch 38. Second limit switch 40 would then be so positioned that travel limiting bar 32 would come into contact therewith when temperature probe 26 is withdrawn 11/16 inch from extruder bore B so as to be substantially flush therewith.

Figure 3:
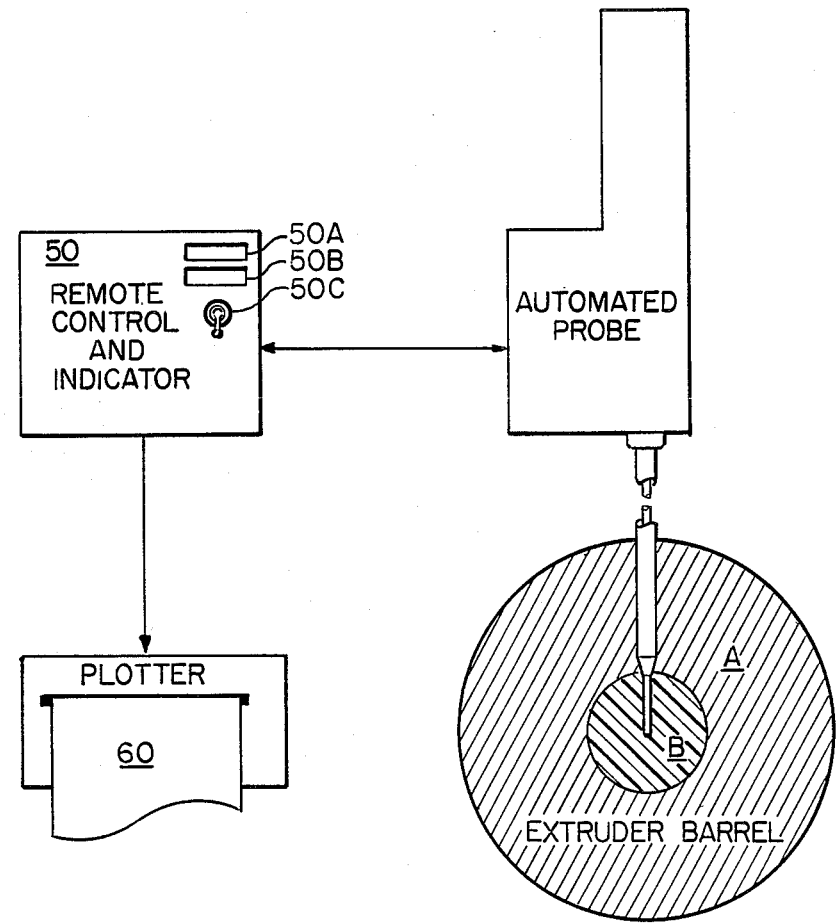
FIG. 3 is a schematic illustration of an automated temperature probe apparatus in accordance with the present invention.

Looking now specifically to FIG. 3, it should be appreciated that motor 12, potentiometer 16 and temperature probe 26 are electrically connected to remote control and indicator 50. Remote control and indicator 50 most suitably comprises a control panel having a temperature indicator 50A, a position indicator 50B, and a switch 50C for actuating temperature probe 26 so as to (1) extend outwardly, (2) to withdraw inwardly, and (3) to deactuate temperature probe 26. Both temperature and corresponding position relating to movement of temperature probe 26 within a viscous material flow are simultaneously indicated on temperature indicator 50A and position indicator 50B as temperature probe 26 is driven into and withdrawn from a viscous material flow. The temperature signals and corresponding position signals provided by temperature probe 26 and potentiometer 16, respectively, and conveyed to remote control and indicator 50 may be linearized and converted to electronic signals for display on temperature indicator 50A and position indicator 50B in either an analog or digital format. Also, as shown in FIG. 3, the signals may also be plotted on an X-Y plotter 60 in order to give a continuous direct temperature profile (temperature versus position) of the viscous material flow during the travel time of temperature probe 26 therein.

As a matter of design choice, the speed of reversible drive motor 12 may be adjusted in order to drive temperature probe 26 at a linear speed which matches the time response of the thermocouple or other suitable temperature measuring element translated thereby. For the preferred embodiment of the invention which utilizes a thermocouple within temperature probe 26, the travel time for a one-inch stroke has been found to be about six minutes. Temperature probe 26 most suitably utilizes a thermocouple temperature measurement device, but it is further contemplated that other temperature measuring elements may be utilized including a fiber optic temperature measuring element and a resistance temperature device (RTD) temperature measuring element.

Furthermore, although also a matter of design choice and not shown in the drawings, temperature probe 26 may be bent at the remote end thereof in order to extend substantially perpendicularly from the longitudinal axis of the elongate probe. Such a configuration would allow the probe to extend generally upstream so as to reduce the shear heating effect of the viscous material flow in proximity to the temperature probe and any associated artificially high temperature associated therewith. Also, two or more temperature probes 26 (not shown in the drawings) may be utilized as a matter of choice in order to give a two-dimensional temperature profile of a viscous material flow. Although other configurations are possible, two probes can be positioned so as to extend substantially radially into a viscous material flow bore wherein the probes are in substantially perpendicular orientation one to the other.

Finally, it is contemplated by the applicant that accurate temperature measurement difficulties which may be encountered due to thermal conductance up the shank of probe tube 28 of temperature probe 26 may be obviated by providing a base temperature measurement device within the end of probe tube 28 and adjacent temperature probe 26. The temperature measurement data from both the temperature probe 26 and the temperature measuring device positioned in probe tube 28 are computed either manually or by a suitably programmed personal computer or the like in order to compute the actual temperature of a viscous material flow which temperature probe 26 traverses.

In operation, automated temperature probe assembly 10 is first secured to a threaded hole in the bore of an extruder or plastic injection molding machine in a manner known to those familiar with this art. Specifically, probe tube 28 will be screwed into corresponding threads in a hole provided in the bore of an extruder or plastic injection molding machine. Remote control and indicator 50 as well as plotter 60 are placed in a suitable safe and convenient location from which the automated probe may be operated and the temperature and corresponding measurement data provided thereby ascertained and, if desired, plotted or otherwise recorded.

When a viscous material flow has been introduced into extruder bore B of extruder barrel A and a temperature profile is desired thereof, the operator moves three-position switch 50C from "off" to the "in" position. Reversible motor 12 is actuated and through driver gear 14 and driven gear 22 serves to linearly translate the non-rotating screw 30 segment of temperature probe 26. Travel limiting bar 32 secured to the upper end of temperature probe 26 will be linearly translated toward first limit switch 38 as temperature probe 26 is driven outwardly from probe tube 28 and into extruder bore B. As temperature probe 26 traverses extruder bore B it will provide a plurality of temperature measurements in either a discrete or continuous matter, as a matter of design choice. Potentiometer 16 is also driven by motor 12 and provides probe position measurement data corresponding to temperature measurement data provided by temperature probe 26, and said temperature and corresponding position measurement data is transmitted by electrical connection to remote control and indicator 50. Remote control and indicator 50 includes temperature indicator 50A and position indicator 50B which display in either linear or analog format the position and temperature measurement data being provided by temperature probe 26 and potentiometer 16 as motor 12 causes temperature probe 26 to traverse extruder bore B. Optionally, the temperature and corresponding position measurement data may be transmitted to an electrically connected X-Y plotter 60 in order to provide a continuous read-out of temperature versus position. Alternatively, the information could be stored in a computer (not shown) or the like for future use.

When temperature probe 26 has traversed extruder bore B a predetermined distance, travel limiting bar 32 comes into contact with first limit switch 38 so as to deactuate motor 12. Switch 50C may now be moved to the "in" position so as to actuate motor 12 to rotate in the opposite direction in order to withdraw temperature probe 26 from extruder bore B. Temperature probe 26 will be withdrawn until travel limiting bar 32 comes into contact with second limit switch 40 and motor 12 is deactuated. Switch 50C may then be turned to "off" if it is not desired to further utilize the automated temperature probe assembly of the present invention. Also, the temperature profile of the viscous material flow may be used to interactively control processing of the viscous material.

In the drawings and specification there has been set forth a preferred embodiment of the invention, and although specific terms are employed, they are used in a generic and descriptive sense only and not for purposes of limitation. In addition, while the automated temperature probe assembly of the invention has been primarily described in association with either plastic injection molding or extrusion apparatus, it will be understood that the temperature probe assembly may be used to measure temperature in a variety of other applications.

What is claimed is:

1. An automated temperature probe for accurately determining by temperature measurements the temperature profile of a viscous material flow by traversing at least a portion of the flow and determining the temperature and corresponding position at a plurality of locations therein, comprising:
   an elongated linearly movable temperature probe for selected insertion into said material flow;
   motor means operatively connected with said temperature probe for imparting linear movement thereto;
   position sensing means operatively connected to said temperature probe for determining the relative position of said probe during said linear movement thereof; and
   remote control means electrically connected to said temperature probe for selectively actuating said probe and providing a temperature profile comprising temperature and corresponding position data provided by said probe movement.

2. An automated temperature probe assembly according to claim 1 including remote means for plotting temperature and corresponding position data provided by said probe assembly in order to determine a said temperature profile of the flow stream of the viscous material flow.

3. An automated temperature probe assembly according to claim 2 wherein said means for plotting comprises an X-Y plotter of the type wherein one axis represents temperature and the other axis represents position.

4. An automated temperature probe assembly according to claim 1 wherein said temperature probe comprises a thermocouple temperature measuring element.

5. An automated temperature probe assembly according to claim 1 wherein said motor means comprises an electric bi-directional motor and gear drive.

6. An automated temperature probe assembly according to claim 1 wherein said position sensing means is a potentiometer operatively connected to said motor means.

7. An automated temperature probe assembly according to claim 1 wherein said remote control means is electrically connected to said probe, said motor means and said position sensing means, and includes indicator means for providing temperature and corresponding position as said probe is moved, and switch means for selectively actuating said probe.

8. An automated temperature probe accurately determining by temperature measurements the temperature profile of a viscous material flow by traversing at least a portion of the flow and determining the temperature and corresponding position at a plurality of locations therein, comprising:
   an elongated linearly movable thermocouple temperature probe for selected insertion into said material flow;
   a motor and gear drive operatively connected to said temperature probe for imparting linear movement thereto;
   position sensing means operatively connected to said temperature probe for determining the relative position of said probe during said linear movement thereof; and
   remote control means electrically connected to said temperature probe for selectively actuating said probe and providing a temperature profile comprising temperature and corresponding position data provided by said probe movement.

9. An automated temperature probe assembly according to claim 8 including means for plotting said temperature and corresponding position data provided by said probe assembly in order to determine a temperature profile of the flow stream of the viscous material flow.

10. A method for accurately measuring the temperature of a viscous material flow comprising the steps of:
remotely actuating at least one temperature probe so as to cause said probe to traverse at least a portion of the viscous material flow;
measuring the temperature of the viscous material flow at a plurality of different positions as said temperature probe traverses said flow;
determining the position of said temperature probe within the viscous material flow corresponding to each of said plurality of temperature measurements; and
remotely controlling said temperature probe and preparing a temperature profile of the viscous material flow from said plurality of temperature and corresponding position measurements.

11. A method for accurately measuring the temperature of a viscous material flow according to claim 10 wherein said viscous material flow is a polymer stream in an extruder apparatus.

12. A method for accurately measuring the temperature of a viscous material flow according to claim 10 wherein said viscous material flow is a molten plastic stream in an injection molding apparatus.

13. A method for accurately measuring the temperature of a viscous material flow according to claim 10 wherein said temperature profile of the viscous material flow is used to interactively control processing of said viscous material flow.

14. A method for accurately measuring the temperature of a viscous material flow according to claim 10 wherein the temperature profile of the viscous material flow is prepared on a plotting apparatus.

* * * * *